(12) United States Patent
Fitzsimons et al.

(10) Patent No.: US 7,182,325 B2
(45) Date of Patent: Feb. 27, 2007

(54) COMPLIANT SPACER

(75) Inventors: Keith Bryden Fitzsimons, Yeovil (GB); David Edward Painter, Yeovil (GB); Michael John Locke, West Camel (GB); Andrew Martin Cave, Yeovil (GB)

(73) Assignee: Westland Helicopters Limited (GB)

( * ) Notice: Subject to any disclaimer, the term of this patent is extended or adjusted under 35 U.S.C. 154(b) by 122 days.

(21) Appl. No.: 10/761,422

(22) Filed: Jan. 22, 2004

(65) Prior Publication Data
US 2005/0001382 A1 Jan. 6, 2005

(30) Foreign Application Priority Data
Jul. 2, 2003 (GB) ................................ 0315419.2

(51) Int. Cl.
*F16F 1/34* (2006.01)
(52) U.S. Cl. .................................. 267/161; 244/17.11
(58) Field of Classification Search ............. 244/17.11; 267/161, 160, 158, 159
See application file for complete search history.

(56) References Cited

U.S. PATENT DOCUMENTS

| | | | |
|---|---|---|---|
| 2,034,258 A | 3/1936 | Hausser | |
| 2,487,952 A | 11/1949 | Sznyeer | |
| 4,043,546 A | 8/1977 | Ashfield et al. | |
| 5,253,852 A * | 10/1993 | Pleva | 267/162 |
| 6,033,182 A * | 3/2000 | Rampal | 416/114 |
| 6,152,665 A * | 11/2000 | Wallace et al. | 411/11 |
| 6,484,967 B2 | 11/2002 | Protte | |

FOREIGN PATENT DOCUMENTS

| | | |
|---|---|---|
| DE | 865 559 | 2/1953 |
| EP | 0 538 529 | 4/1993 |
| FR | 2 688 037 | 9/1993 |
| GB | 21824 | 9/1911 |
| GB | 502237 | 3/1939 |

OTHER PUBLICATIONS

Patent Abstracts of Japan, vol. 018, No. 254 (M-1605), May 16, 1994—& JP 06 033963 A (Ishikawajima Harima Heavy Ind Co Ltd), Feb. 8, 1994 * abstract; Figures 1-6 *.

* cited by examiner

*Primary Examiner*—Tien Dinh
(74) *Attorney, Agent, or Firm*—Stites & Harbison PLLC; Marvin Petry

(57) ABSTRACT

A compliant spacer which, in use, is located between planar surfaces of two machine elements which are, in use, clamped together in an assembly, the spacer having a first generally planar face and a second oppositely facing generally planar face which is generally parallel to the first generally planar face, each of the first and second generally planar faces having a plurality of raised regions, the raised regions of the first face being offset with respect to the raised regions of the second face, so that as the two machine elements are clamped together with the spacer therebetween, the spacer deforms out of plane to maintain the clamping load in use, and each raised region including a bearing surface and edge regions where the raised region joins the respective planar face of the spacer, the bearing surface being generally planar and parallel to the first and second planar faces, and the edge regions of the raised regions melding smoothly into the respective planar face of the spacer without any sharp discontinuity.

12 Claims, 2 Drawing Sheets

COMPLIANT SPACER

BACKGROUND OF THE INVENTION

This invention relates to a compliant spacer which in use is located between two machine elements which are clamped together to provide an assembly, to maintain the clamping load in use, as the first and second machine elements of the assembly may relatively move due to mechanical e.g. vibration, and thermal effects.

DESCRIPTION OF THE PRIOR ART

There have been previous proposals for compliant spacers, but existing solutions have been found to be inadequate where the amount of compliance required is substantial for a large clamping load. Such previous proposals have included a sleeve design but this was found to be not sufficiently compliant; a conventional spring washer but this required more space than was available between the machine elements to be clamped together; and a conical washer but a conical washer was found not be able to tolerate the high stresses in the assembly.

For example in an assembly of the attachment of a helicopter main rotor head to a main gearbox, a clamping force is required between these machine elements to provide a pre-load on a bearing which permits of relative rotation between these elements. In such an application, a spacer which accommodates a deflection of 0.1 mm over a 15 mm spacing between the machine elements, under an axial loading of 159 KN could not be accommodated by these previous proposals.

It is important that any spacer between these machine elements, does not mark or otherwise damage the machine element surfaces, when a clamping load is applied.

SUMMARY OF THE INVENTION

According to a first aspect of the invention we provide a compliant spacer which, in use, is located between planar surfaces of two machine elements which are, in use, clamped together in an assembly, the spacer having a first generally planar face and a second oppositely facing generally planar face which is generally parallel to the first generally planar face, each of the first and second generally planar faces having a plurality of raised regions, the raised regions of the first face being offset with respect to the raised regions of the second face, so that as the two machine elements are clamped together with the spacer therebetween, the spacer deforms out of plane to maintain the clamping load in use, and each raised region including a bearing surface and edge regions where the raised region joins the respective planar face of the spacer, the bearing surface being generally planar and parallel to the first and second planar faces, and the edge regions of the raised regions melding smoothly into the respective planar face of the spacer without any sharp discontinuity.

Depending on the thickness of the spacer, by carefully selecting the number of raised regions on each generally planar face, the extent of the raised regions, and thus the spacing between the raised regions, a desired flexibility to maintain the clamping load in the assembly, can be achieved and by virtue of the planar bearing surface and the edge regions, there is little or no risk of the machine element surfaces being marked when a clamping force is applied. Thus a spacer of a certain nominal thickness may be "tuned" for a particular application, by changing the number of, extent of and spacing between the raised regions on each of the first and second generally planar faces.

Preferably the same number of raised regions are provided on each of the first and second planar faces, the raised regions on the first face being interposed between the raised regions of the second face, for example, midway between the raised regions of the second face, so that in use, the spacer deforms out-of-plane generally constantly along the spacer. Preferably more than two raised regions are provided on each of the first and second planar faces, and more preferably more than five.

The spacer may in one example be generally annular, the first and second planar faces facing axially of the spacer. Thus each raised region may extend circumferentially around the axis of the spacer.

In one example, each raised region may extend circumferentially of the annular spacer for between 3° and 12° around the annulus, and preferably in the order of 6°, although a greater or lesser raised region extent may be desirable to allow a maximum predetermined out-of-plane deflection whilst maintaining the clamping load.

The raised regions on each planar face preferably each extend outwardly of the respective planar face by between 2% and 10% of the nominal thickness of the spacer between the planar faces, and more preferably about 3%–5% of the nominal thickness between the planar faces, although the actual outward extent of the raised regions may be selected for the nominal thickness of the spacer and material from which the thickness is made, to achieve a desired resistance to out-of-plane deformation as the clamping load is applied.

Typically the nominal thickness of the spacer may be about 15 mm although where a greater space between the machine elements is to be filled, the assembly may include a plurality of spacers in accordance with the first aspect of the invention, arranged in a stack.

According to a second aspect of the invention we provide an assembly of first and second machine elements which in use are clamped together with a spacer in accordance with the first aspect of the invention, therebetween.

The assembly may in one example only include a first machine element which is part of a rotor head of a helicopter rotor system, and the second machine element is part of a gearbox of the helicopter, the assembly including a bearing which permits of relative rotation between the first and second machine elements, the spacer permitting the first and second machine elements to be clamped together to provide a loading force on the bearing.

BRIEF DESCRIPTION OF THE DRAWINGS

Embodiments of the invention will now be described with reference to the accompanying drawings in which.

DETAILED DESCRIPTION OF THE DRAWINGS

Figure 1:
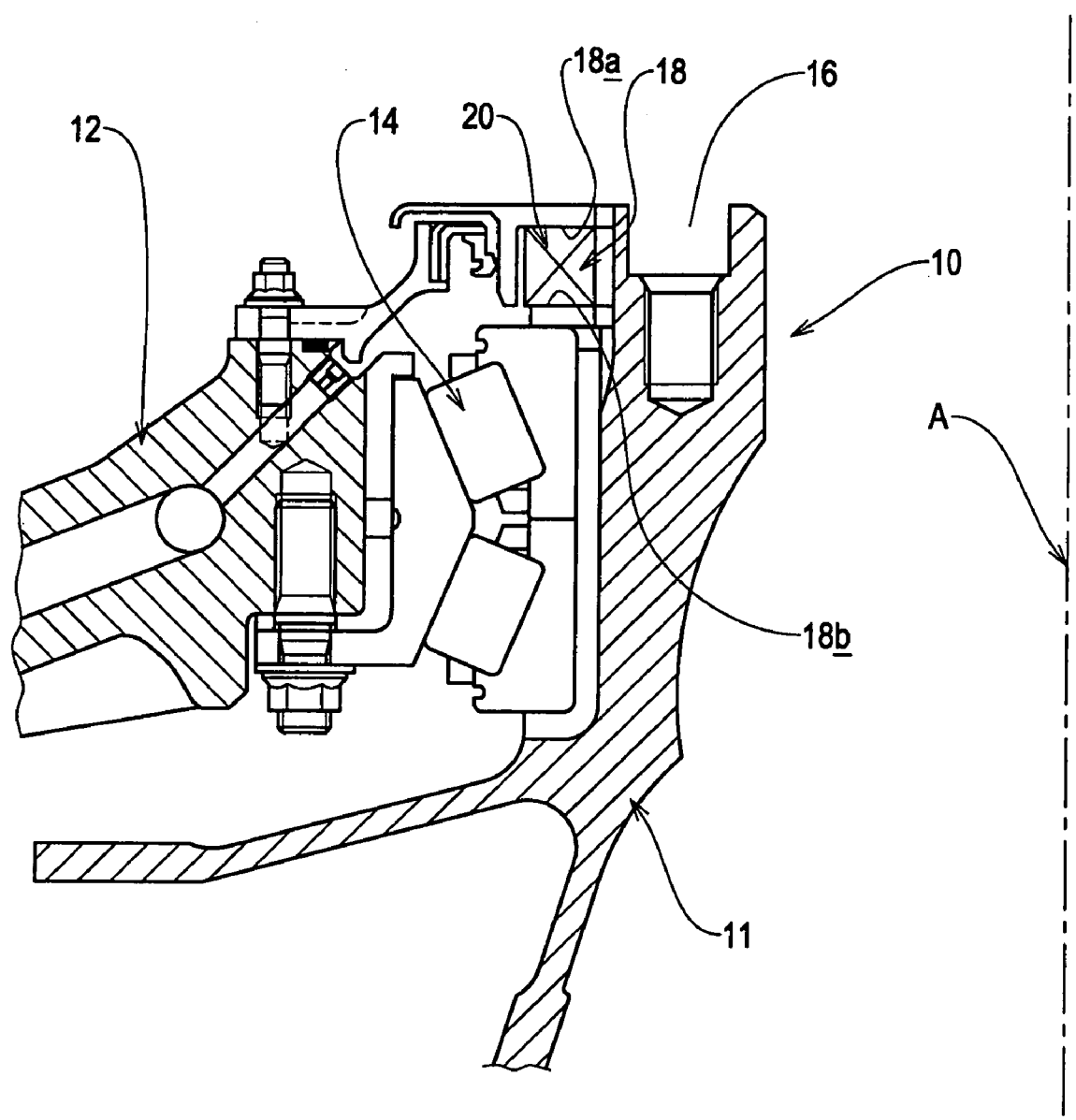
FIG. 1 is an illustrative cross sectional view of part of an assembly of machine elements incorporating a compliant spacer in accordance with the invention.

Referring to the drawings, an assembly 10 includes a first machine element 11 which in this example is an output shaft of a gearbox in a helicopter, and a second machine element 12 which in this example is a part of a rotor head of the helicopter main rotor system.

Between the first and second machine elements 11, 12, there is a bearing 14 which permits of relative rotation between the first and second machine elements. The machine elements 11, 12 are clamped together as a plurality of fasteners (not shown) around an axis of rotation A are tightened into receiving openings 16. In a space 18 between the machine elements 11, 12 is a compliant spacer 20 which in this example is annular in configuration, and centred on the axis of rotation A.

As the clamping force is applied between the first and second machine elements 11, 12, the loading force is applied to the bearing 14. The compliant spacer 20 maintains the clamping force generally constant when movements between the first and second machine elements 11, 12 due to vibration, or thermal effects, may change the spacing between the machine elements 11, 12.

Figure 2:
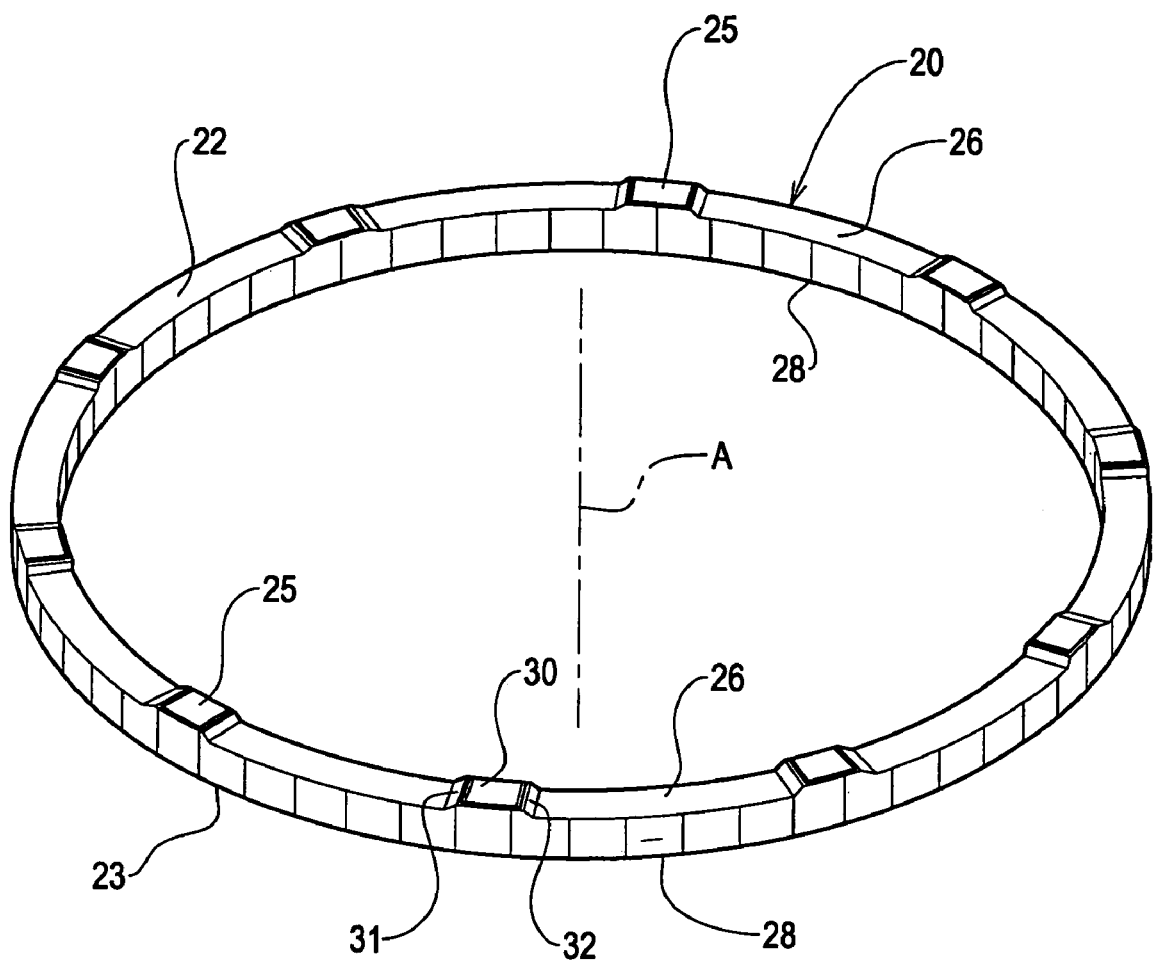
FIG. 2 is a perspective illustrative view to an enlarged scale of the compliant spacer of the assembly of FIG. 1.

Referring particularly to FIG. 2, the spacer includes a first, axially facing, generally planar surface 22, and a second, oppositely axially facing, generally planar surface 23, the first and second planar surfaces 22, 23 lying generally parallel to one another.

The first planar surface 22 has a first set of raised regions, in this example, ten raised regions 25, each of which extends around the circumferential extent of the annular spacer 20, for about 6°, but this extent may be varied, for example to between 3° and 12° or more or less, depending on the amount of compliance required for a particular application, and other manufacturing configurations, as will be discussed below.

Thus the raised regions 25 of the first set are generally equally spaced around the circumferential extent of the annular spacer 20, with there being spaces 26 between adjacent pairs of raised regions 25.

The second planar face 23 has a second set of raised regions 28, which are similar in configuration to the raised regions 25 of the first set, and are equal in number. The raised regions 28 of the second set are each positioned in a space 26 between a pair of the raised regions 25 of the first set, and desirably, generally centrally between the pair of raised regions 25 of the first set.

The raised regions 25, 28 of the first and second sets, in this example, are generally identically configured, each having a bearing surface 30, and edge regions 31, 32. The edge regions 31, 32 are smooth so that there is no discontinuity as may be provided by a sharp edge, and thus the bearing surfaces 30 meld into the adjacent planar face 22, 23. Thus there is no discontinuity which could mark surfaces 18a, 18b of the machine elements 11, 12 with which the raised regions 25, 28 engage as the clamping force is applied.

Desirably, the top/bottom bearing surfaces 30 of the raised regions 25, 28 are very slightly crowned i.e. the bearing surface 30 edges adjacent the edge region, 32 may be machined very slightly lower than central areas of the bearing surfaces 30, so that when the spacer 20 is loaded, the bearing surface 30 will be flat. However, the bearing surfaces 30 generally are flat and generally parallel to the respective planar face 22, 23 on which they are provided.

With the spacer 20 in place, as a clamping force is applied between the first and second machine elements 11, 12, the spacer will be deformed out-of-plane between the alternate raised regions 25, 28 of the first and second sets by an amount determined by the clamping force on the one hand, and the combination of the resilience of the material from which the spacer 20 is made, the number of and spacing of the raised regions 25, 28, and the extent of the raised regions 25, 28, out-of-plane. Generally the thinner axially the spacer 20, the more deformation will be possible, and the greater the spacing between the raised regions 25, 28 of the first and second sets, the more deformation will be possible.

Also, the less the extent of the raised regions 25, 25 circumferentially of the spacer 20, the greater the permitted deformation.

Thus the spacer 20 may be "tuned" to allow a maximum deformation out-of-plane whilst maintaining a predetermined resistance to the clamping force applied, so that the spacer 20 can maintain the clamping force constant irrespective of small movements between the machine elements 11, 12.

In the example described, the nominal thickness of the spacer 20 between the first and second planar faces 22, 23 may be about 15 mm, and the raised regions 25, 28 of each of the first and second sets, may extend outwardly of the respective planar face 22, 23 axially of the spacer 20, by about 0.5 mm. The spacer 20 be made from steel, and with the ten raised regions 25, 28 in each of the first and second sets, the spacer 20 may permit of a maximum out-of-plane deformation of about 0.1 mm, so that movements between the first and second machine elements 11, 12 may occur, whilst a generally constant clamping force, to maintain the pre-loading on the bearing 14, may be maintained.

Various modifications may be made without departing from the scope of the invention.

For example, as discussed above, the configuration of the spacer 20 may be changed to alter the maximum deformation provided for, and the resilience of the spacer 20. The spacer may in another assembly 10 not be annular in configuration, but may be of another shape having opposed planar faces 22, 23 with respective raised regions 25, 28.

The raised regions 25, 28 on the respective planar faces 22, 23 need not be identical in number or configuration.

Where the space 18 to be filled, between the surfaces 18a, 18b of the first and second machine elements 11, 12 is greater than can be accommodated by a single spacer 20, if desired more than one, e.g. a stack of spacers 20 may be provided, which together are configured to comply as required as the distance between the two machine elements 11, 12 may change in use.

The invention claimed is:

1. A compliant spacer which, in use, is located between planar surfaces of two machine elements which are, in use, clamped together in an assembly, the spacer having a first generally planar face and a second oppositely facing generally planar face which is generally parallel to the first generally planar face, each of the first and second generally planar faces having a plurality of raised regions, the raised regions on each planar face each extending outwardly of the respective planar face by between 2% and 5% of the nominal thickness of the spacer between the planar faces, the raised regions of the first face being offset with respect to the raised regions of the second face, so that as the two machine elements are clamped together with the spacer therebetween, the spacer deforms out of plane to maintain the clamping load in use, and each raised region including a bearing surface and edge regions where the raised region joins the respective planar face of the spacer, the bearing surface being generally planar and parallel to the first and second planar faces, and the edge regions of the raised regions melding smoothly into the respective planar face of the spacer without any sharp discontinuity.

2. A spacer according to claim 1 wherein the same number of raised regions are provided on each of the first and second planar faces, the raised regions on the first face being interposed between the raised regions of the second face.

3. A spacer according to claim 2 wherein the raised regions of the first planar face are mid-way between the raised regions of the second face.

4. A spacer according to claim 1 wherein more than two raised regions are provided on each of the first and second faces, namely more than five.

5. A spacer according to claim 1 wherein the spacer is generally annular.

6. A spacer according to claim 5 wherein each raised region extends circumferentially around the axis of the spacer.

7. A spacer according to claim 6 wherein each raised region extends circumferentially of the annular spacer for between 3° and 12° around the annulus.

8. A spacer according to claim 1 wherein the raised regions on each planar face each extend outwardly of the respective planar face by about 3% of the nominal thickness of the spacer between the planar faces.

9. A spacer according to claim 1 wherein the nominal thickness of the spacer between the planar faces is about 15 mm.

10. An assembly of first and second machine elements which in use are clamped together with a spacer therebetween, the spacer having a first having a first generally planar face and a second oppositely facing generally planar face which is generally parallel to the first generally planar face, each of the first and second generally planar faces having a plurality of raised regions, the raised regions on each planar face each extending outwardly of the respective planar face by between 2% and 5% of the nominal thickness of the spacer between the planar faces, the raised regions of the first face being offset with respect to the raised regions of the second face, so that as the two machine elements are clamped together with the spacer therebetween, the spacer deforms out of plane to maintain the clamping load in use, and each raised region including a bearing surface and edge regions where the raised region joins the respective planar face of the spacer, the bearing surface being generally planar and parallel to the first and second planar faces, and the edge regions of the raised regions melding smoothly into the respective planar face of the spacer without any sharp discontinuity.

11. The assembly according to claim 10 wherein the first machine element is a part of a rotor head of a helicopter rotor system, and the second machine element is part of a gearbox of the helicopter, the assembly including a bearing which permits of relative rotation between the first and second machine elements, the spacer permitting the first and second machine elements to be clamped together to provide a loading force on the bearing.

12. The spacer of claim 7, wherein each raised region extends circumferentially of the annular spacer in the order of 6° around the annulus.

* * * * *